(12) United States Patent
Zecchini et al.

(10) Patent No.: US 10,691,926 B2
(45) Date of Patent: Jun. 23, 2020

(54) SINGLE-PIXEL SENSOR

(71) Applicant: Analog Devices, Inc., Norwood, MA (US)

(72) Inventors: Maurizio Zecchini, San Jose, CA (US); Paul O'Sullivan, San Jose, CA (US); Chao Wang, Milpitas, CA (US)

(73) Assignee: ANALOG DEVICES, INC., Norwood, MA (US)

( * ) Notice: Subject to any disclaimer, the term of this patent is extended or adjusted under 35 U.S.C. 154(b) by 0 days.

(21) Appl. No.: 15/970,539

(22) Filed: May 3, 2018

(65) Prior Publication Data
US 2019/0340418 A1    Nov. 7, 2019

(51) Int. Cl.
*G06K 9/00* (2006.01)
*G01S 17/10* (2020.01)

(52) U.S. Cl.
CPC .......... *G06K 9/00268* (2013.01); *G01S 17/10* (2013.01); *G06K 9/00288* (2013.01)

(58) Field of Classification Search
CPC . G06K 9/00268; G06K 9/00288; G01S 17/10
See application file for complete search history.

(56) References Cited

U.S. PATENT DOCUMENTS

| | | |
|---|---|---|
| 6,757,018 B1 | 6/2004 | Fowler |
| 8,295,610 B1 | 10/2012 | Brunner |
| 8,884,229 B2 | 11/2014 | Barlow et al. |
| 8,958,005 B1 | 2/2015 | Miao et al. |
| 9,549,158 B2 | 1/2017 | Grauer et al. |
| 9,870,506 B2 | 1/2018 | Gousev et al. |
| 2002/0071022 A1 | 6/2002 | Kojima |
| 2004/0036851 A1* | 2/2004 | Hunter ............ G01P 3/68 356/5.01 |

(Continued)

FOREIGN PATENT DOCUMENTS

| | | |
|---|---|---|
| EP | 3145177 | 3/2017 |
| JP | 2012/060411 | 3/2012 |
| KR | 101422549 | 7/2014 |

OTHER PUBLICATIONS

Marco F. Duarte et al., *Single-Pixel Imaging via Comprehensive Sampling*, IEEE © Mar. 28, 2008, pp. 83-91.

(Continued)

*Primary Examiner* — Shawn S An
(74) *Attorney, Agent, or Firm* — Patent Capital Group

(57) ABSTRACT

The present disclosure relates to performing facial recognition using a single-pixel sensor that measures the time signature of a light pulse reflected from a subjects face. Due to depth differences between the sensor position and different parts of the subject's face reflections of a short duration illumination pulse from the different parts of the subject's face will arrive back at the sensor at different times, thus providing a time-based one-dimensional signature unique to the individual subject. By analyzing the reflection signature using neural networks or principal component analysis (PCA), recognition of the subject can be obtained. In addition, the same system may also be used to recognize or discriminate between any other objects of known shape in addition to faces, for example manufactured products on a production line, or the like.

16 Claims, 13 Drawing Sheets

(56) References Cited

U.S. PATENT DOCUMENTS

| | | | |
|---|---|---|---|
| 2005/0276469 A1 | 12/2005 | Kim | |
| 2007/0019264 A1* | 1/2007 | Tanijiri | G02B 5/32 359/15 |
| 2013/0237800 A1* | 9/2013 | Yamamoto | A61B 5/0095 600/407 |
| 2015/0085136 A1 | 3/2015 | Bernal et al. | |
| 2015/0237246 A1* | 8/2015 | Omi | H04N 5/2353 348/362 |
| 2015/0264401 A1 | 9/2015 | Hayashi | |
| 2016/0140436 A1* | 5/2016 | Yin | G06N 3/08 706/20 |
| 2016/0231420 A1* | 8/2016 | Kryvobok | G01S 17/325 |
| 2018/0068206 A1* | 3/2018 | Pollach | G06K 9/00791 |
| 2018/0268747 A1* | 9/2018 | Braun | G09F 13/12 |
| 2019/0188980 A1* | 6/2019 | Viswanathan | G06K 9/00711 |
| 2019/0213420 A1* | 7/2019 | Karyodisa | G06K 9/00228 |

OTHER PUBLICATIONS

Huichao Chen et al., *Single-Pixel Non-Imaging Object Recognition by Means of Fourier Spectrum Acquisition*, ScienceDirect, vol. 413, © Apr. 15, 2018, pp. 269-275.

Tai-Xiang Jiang et al., *Patch-Based Principal Component Analysis for Face Recognition*, Computational Intelligence and Neuroscience, vol. 2017, Article ID 5317850, 9 pages, © 2017.

Srinivas Halvi et al., *Fusion Based Face Recognition System Using 1D Transform Domains*, Procedia Computer Science, © 2017, 8 pages.

Mejda Chihaoui et al., *A Survey of 2D Face Recognition Techniques*, MDPI © 2016, Basel Switzerland, 28 pages.

Patil A.M. et al., *2D Face Recognition Techniques: A Survey*, International Journal of Machine Intelligence, ISSN: 0975-2927, vol. 2, Issue 1, 2010, 10 pages.

Meftah Ur Rahman, *A Comparative Study on Face Recognition Techniques and Neural Network*, Department of Computer Science, George Mason University, 8 pages, © 2012.

Ming-Jie Sun et al., *Single-Pixel Three-Dimensional Imaging with Time-Based Depth Resolution*, Jul. 5, 2016, Nature Communications, 6 pages.

Milos Oravec et al., *Efficiency of Recognition Methods for Single Sample per Person Based Face Recognition*, Jul. 27, 2011, 11 pages.

Andrew J. Calder et al., *A Principal Component Analysis of Facial Expressions*, Vision Research, © 2001, 30 pages.

Google Patents Translation into English of JP 2012/060411.

Google Patents Translation into English of KR 20140061189.

EP Office Action issued in EP Patent Application Serial No. 19171849.3 dated Aug. 23, 2019, 9 pages.

Sun et al., *3D Computational Imaging with Single-Pixel Detectors*, www.sciencemag.org, May 17, 2013, vol. 340, 5 pages.

Meers et al., *Face Recognition Using a Time-of-Flight Camera*, 2009 Sixth International Conference on Computer Graphics, Imaging and Visualization, 6 pages.

Simón et al., *Improved RGB-D-T Based Face Recognition*, The Institution of Engineering and Technology, Mar. 29, 2016, 8 pages.

Vázquez et al., *A 3D Facial Recognition System Using Structured Light Projection*, HAIS 2014, LNAI 8480, © Springer International Publishing, Switzerland, 14 pages.

\* cited by examiner

| Use case | 2D Camera | SPFR 3D | Comment |
|---|---|---|---|
| Real person | Verify | Verify | Twins would be verified by both systems |
| Fake (picture) | Verify | Reject | Primary advantage of SPFR system |
| Fake (mask) | Verify | Verify | 3D system may be able to identify difference in magnitude of reflectance? |
| Real (poor light) | Uncertain | Verify | Potential area to improve recognition accuracy |

FIGURE 16

SINGLE-PIXEL SENSOR

TECHNICAL FIELD OF THE DISCLOSURE

The present disclosure relates to a single-pixel sensor that measures the time signature of a diffused light pulse reflected from an object. Due to depth differences between the sensor position and different parts of the object reflections of a short duration illumination pulse arrive back at the sensor at different times, thus providing a time-based one-dimensional signature unique to the individual object.

BACKGROUND

Facial recognition systems commonly use visual acquisition and algorithms to identify or authenticate a person by analyzing certain facial features (such as relative position of nose, eyes, jaw and others) and comparing against a reference or samples within a database. They are most commonly implemented using an image or video feed in conjunction with a computing system executing an identification algorithm. They can be used standalone or in conjunction with other biometrics such as retina/iris and fingerprint scanning. The trend in smartphones is to add facial recognition to authentication functions as an alternative or in addition to personal identification number (PIN) codes and/or fingerprint. Such systems often use a two-dimensional (2D) camera to acquire the facial information, but a 2D only system is easy to defeat with a still picture. Even when using added levels of security (e.g. requirement to blink one eye during recognition) such systems are usually not robust and secure enough to replace other biometric sensors.

BRIEF SUMMARY OF THE DISCLOSURE

The present disclosure relates to performing facial recognition using a single-pixel sensor that measures the time signature of a diffused light pulse reflected from a subject's face. In some examples a small number of such sensors may be used together, for example to obtain different perspectives of the scene to be measured. Due to depth differences between the sensor position(s) and different parts of the subject's face reflections of a short duration illumination pulse, from the different parts of the subject's face, will arrive back at the sensor at different times, thus providing a time-based one-dimensional signature unique to the individual subject. By analyzing the reflection signature using algorithms such as principal component analysis (PCA) or artificial neural networks (ANN), recognition of the subject can be obtained. In addition, the same system may also be used to recognize or discriminate between any other objects of known shape in addition to faces, for example manufactured products on a production line, or the like.

In view of the above, one example of the present disclosure provides a sensor for detecting an object, the sensor comprising a light source arranged to emit a short duration light pulse to illuminate a face of the object, a photo detector arranged to detect light from the light pulse reflected from the object's face to generate a one-dimensional time-based reflection signal representative of properties of the object's face, and a processor arranged to receive signals representative of the reflection signal and to generate a time-based reflection signature for the object in dependence thereon. With such an arrangement the one-dimensional time-based reflection signal is used to allow a reflection signature to be generated, which can then be used in many applications, for example to recognize or authenticate the object.

For example, a recognition processor is provided where the recognition processor is arranged to receive the time-based reflection signature and to recognize the object in dependence on the reflection signature. Automated recognition of objects can be useful in many scenarios, including on production lines, and for security purposes.

In one example, the recognition processor utilizes machine learning techniques to recognize the object based on the time-based reflection signature. For example, the machine learning techniques may include at least one of a) PCA, and/or b) one or more neural networks. Other artificial intelligence technologies that are able to perform automated or assisted recognition of objects may also be used.

In one example, reference channel componentry is also provided, where the reference channel componentry is arranged to receive at least a portion of the short duration light pulse directly from the light source to provide a reference signal. The processor may then be further arranged to normalize the reflection signal in dependence on the reference signal to account for unwanted characteristics in the illumination pulse. Such an arrangement allows for irregularities in the illumination pulse to be compensated automatically, and thus improves the detection and recognition performance of the sensor.

In a more detailed example, the light source may have a ringing characteristic, and the reference channel componentry comprises a reference photodetector arranged to detect the ringing characteristic. The processor may then be further arranged to receive a signal generated by the reference photodetector in response to the ringing characteristic and to normalize the reflection signal to remove artefacts therein caused by the ringing.

In one example a two-dimensional spatial based recognition system may also be provided in combination with the one-dimensional (1D) sensor. The two-dimensional spatial based recognition system may be arranged to capture a two-dimensional image of the face of the object and to undertake a recognition of the object in dependence thereon. The recognition processor may then generate an output signal indicative of successful recognition of the object in dependence on recognition of the object using both the two-dimensional image and the one-dimensional time-based reflection signal. With such an arrangement the 2D sensor and the 1D sensor may work together synergistically, with the recognition of the subject taking place using the 2D sensor, and the 1D sensor validating that the scene that was recognized also contains sufficient depth, and hence is not simply a photograph or other 2D image of the object to be recognized.

In one example the object is a human subject, and the face of the object is the human subject's face. In this respect, examples of the present disclosure can be particularly designed for recognizing the faces of human subjects, and in particular for the purposes of automatically unlocking portable electronic devices such as mobile telephones or tablet devices, or the like.

In an example, the recognition processor may store object-specific one-dimensional time-based signal trace data (or corresponding mathematical template) against which the time-based reflection signature (or corresponding template) is compared to recognize the object. In particular the object-specific time-based signal trace data may comprise respective sets of samples of respective object-specific time-based signal traces captured during a training phase, and the recognition processor interpolates between the set of samples (e.g., sampled data points) to recreate the signal traces to match against.

From another aspect, a further example of the present disclosure provides a method of operating a single-pixel sensor, comprising: illuminating an object with a short duration pulse of light, detecting light from the light pulse reflected from the object at a single-pixel sensor to obtain a one-dimensional reflection time trace representative of the light reflected from a whole illuminated face of the object illuminated by the pulse of light, comparing the one-dimensional reflection time trace with stored representations of one-dimensional reflection time traces obtained from known objects, and then identifying or authenticating the object in dependence on the comparison as the object whose stored time trace matches the obtained time trace.

In one example, the identifying comprises utilizing a machine learning techniques to recognize the object based on the obtained time trace. For example, the machine learning techniques may include at least one of a) PCA and/or b) one or more neural networks.

In a further example, the method may further comprise receiving at least a portion of the short duration light pulse directly from the light source to provide a reference signal, and normalizing the reflection time trace in dependence on the reference signal to account for unwanted characteristics in the short duration light pulse. In particular the short duration light pulse may have a ringing characteristic, and the method may further comprise detecting the ringing characteristic, and normalizing the reflection time trace to remove artefacts therein caused by the ringing.

In a further example the method may further be used in combination with a 2D sensor, to allow 2D sensor validation of the 1D sensor's findings, or vice versa. In particular, in one example the method may further include capturing a two-dimensional image of the face of the object and undertaking a recognition of the object in dependence thereon. A successful recognition of the object can then be made in dependence on recognition of the object using both the 2D image and the 1D time trace.

In one example the method further includes storing object-specific one-dimensional time-based signal trace data against which the one-dimensional time trace is compared to recognize the object. In particular, in a more detailed example the object-specific time-based signal trace data comprises respective sets of samples of respective object-specific time-based signal traces captured during a training phase, the method further comprising interpolating between the set of samples (e.g., sampled data points) to recreate the signal traces to match against.

From a yet further aspect another example of the present disclosure provides a sensor system, comprising: a single-pixel sensor arranged to capture a one-dimensional reflection trace corresponding to light reflected from a subject user's face from a short duration illumination pulse; a two-dimensional image sensor arranged to capture a two-dimensional image of the subject user's face; and one or more processors arranged to validate the subject user in dependence on the captured two-dimensional image and the captured one-dimensional reflection trace, and control a device of which the sensor system forms a part to operate in dependence on the validation. With such an arrangement the data from the one-dimensional sensor can be used to confirm a facial recognition made on the basis of the two-dimensional image data, for example to confirm that the two-dimensional sensor system is not being spoofed by a photo or other image of the subject user.

In further examples of the present disclosure a plurality of single-pixel sensors can be provided arranged to capture respective one-dimensional reflection traces corresponding to light reflected from the subject user's face, and one or more processors are further arranged to validate the subject user in dependence on the respective one-dimensional reflection traces. Providing a plurality of such single-pixel sensors allows the sensors to have a slightly different field of view of the subject user, and hence should increase accuracy of validation or recognition of the user, and/or reduce the amount of time required to capture suitable reflection trace samples.

Further features, examples, and advantages of the present disclosure will be apparent from the following description and from the appended claims.

BRIEF DESCRIPTION OF THE DRAWINGS

To provide a more complete understanding of the present disclosure and features and advantages thereof, reference is made to the following description, taken in conjunction with the accompanying Figures, wherein like reference numerals represent like parts, in which:

FIG. 16 is a table listing use cases for examples of the disclosure.

DETAILED DESCRIPTION

The present disclosure relates to a new type of sensor for sensing the shape of objects, such as human faces. The sensor comprises a single photodetector that acts as a single-pixel sensor, together with an illumination flash that acts to temporarily illuminate the object to be sensed with a short diffused illumination pulse. The sensor then records the temporal reflected waveform that arrives back at the sensor from the whole part of the illuminated object, and the waveform (or corresponding mathematical template) can then be compared with stored signature waveforms (or templates) corresponding to objects to be recognized in order to allow object recognition to take place. Of particular note is that the single-pixel sensor does not scan across the object taking samples from small parts (e.g. raster scan across the object), but instead receives reflections from the whole illuminated face of the object that is illuminated by the flash, relying on the temporal difference in time-of-arrival of the reflected light at the sensor from different parts of the object with different depths with respect to the sensor. By then looking at the received temporal waveform and identifying small changes therein due to the different relative depths (relative to the sensor) of reflecting parts of the object the object can be characterized and recognized.

In more detail, examples of the present disclosure are based on analyzing the temporal response from a diffused short laser pulse reflected from an object (such as a face) received by a single photodetector (such as a photodiode (PD), avalanche photodiode (APD), Silicon Photo Multiplier (SiPM), or single-photon avalanche diode (SPAD)). The received electrical response is the convolution of the laser pulse with a vector containing the depths within the field of view (FOV). Although it is often not possible to reconstruct the target object, at least with a single fixed exposure, the signal presents a signature that can be used to discriminate the subject and perform a facial recognition with an algorithm. Such a system may operate in some examples in conjunction with a 2D imager, offering the potential advantage of being a smaller, lower cost, and lower power consuming implementation compared to a 3D imager such as a structured light imager.

Figure 1:
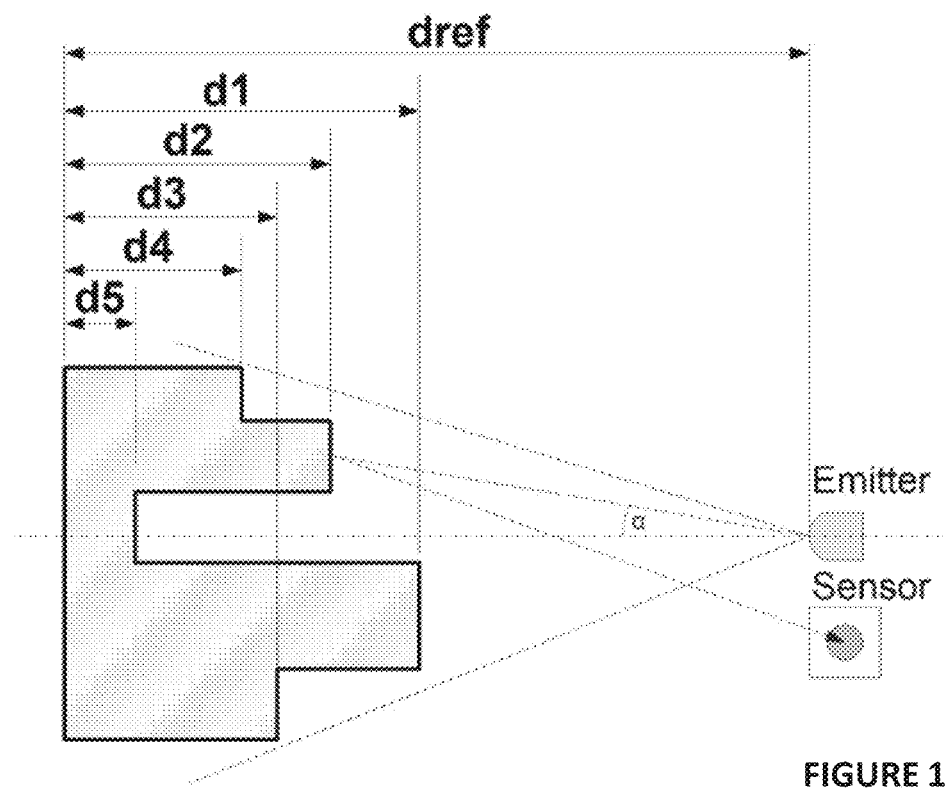
FIG. 1 is a diagram illustrating the concept of operation of an example of the disclosure.
Figure 2:
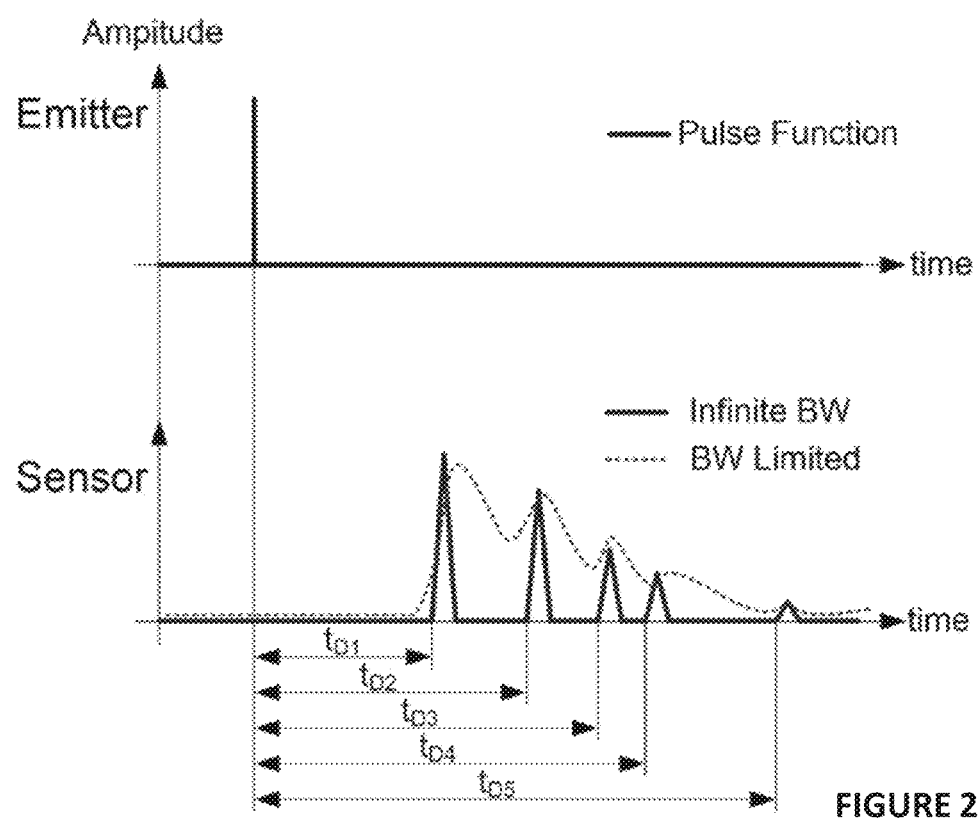
FIG. 2 is a graph illustrating signals derived from the example of FIG. 1.

FIGS. 1 and 2 illustrate the principle of operation of examples of the disclosure in more detail. Referring first to FIG. 1, imagine a light emitter is provided with a co-located light sensor next to it. The co-location of the emitter and the sensor are such that light reflects back from the object to the sensor at almost the same angle alpha (a) as the incident angle of the light rays from the emitter. Next consider an example object which has a surface which presents multiple depths $D_1$ to $D_5$ to light incident on it from the emitter. The emitter and the sensor are at a reference depth $D_{REF}$ from the rear surface of the object, with the example depths representing the surface relief of the object $D_1$ to $D_5$ all being measurably less than $D_{REF}$.

In operation the emitter generates a short diffused light pulse, typically of the order of a few nanoseconds, although better results are obtained with as short an illumination as possible, ideally measured in a few picoseconds. The light pulse illuminates the surfaces of the object facing the emitter, and light reflects back from those surfaces to the co-located sensor. As shown in FIG. 2, light from the different surfaces having different relative depths with respect to the emitter arrives back at the sensor at different times. Within FIG. 2 the light pulse emitted by the emitter is shown on the top trace, with the bottom trace then showing the time it takes for the sensor to detect reflected light from the light pulse from the different depth surfaces of the object. Thus, for example, the light from surface with distance $D_1$ which is closer to the emitter is reflected at time TD1, whereas the light from surface $D_2$ which is further away from the emitter reflects back to the sensor at time TD2. Similarly for light reflected from surfaces $D_3$, $D_4$, and $D_5$, which are then received back at the sensor at times TD3, TD4, and TD5 respectively. The time trace of the reflected light therefore provides a characteristic signal representative of the different depth surfaces of the object, and is able to act as a signature time trace of reflected light that is then characteristic of the object. As will be seen in FIG. 2, with a theoretical infinite bandwidth of the sensor then distinct pulses from each surface of different depth can be discerned within the trace. However, in real life the sensor will be of limited bandwidth, leading to significant rise and fall times for the signal generated by the sensor in response to incident light, with the result that the signature trace will be more like that shown in the dotted line on FIG. 2. However, this signature trace is still characteristic of the shape of the object, and can be used for object characterization and recognition. By storing data corresponding to the bandwidth limited signature traces of multiple objects, and then comparing a measured trace from an illumination with the stored signature traces, object characterization and identification can be performed.

Figure 3:
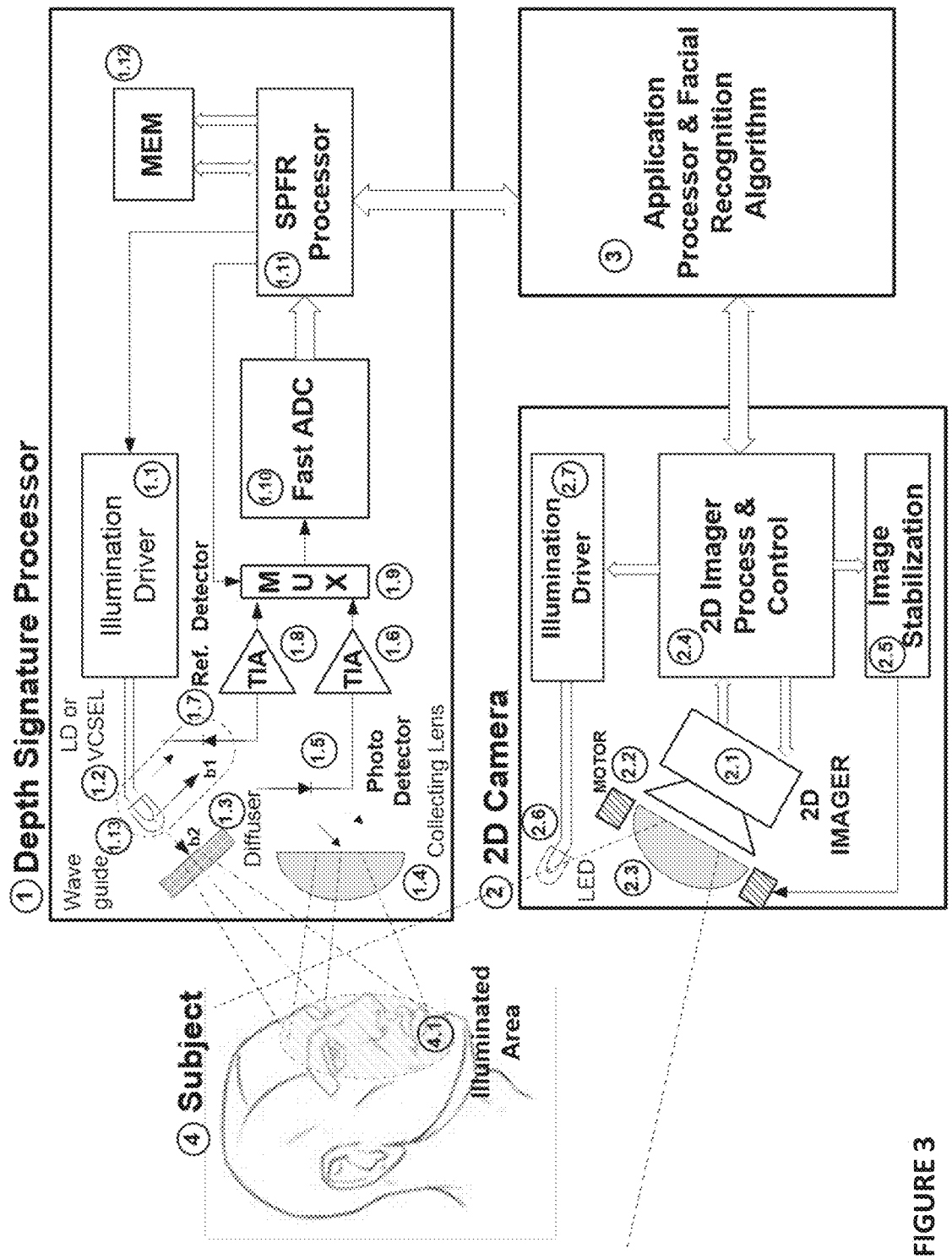
FIG. 3 is a block diagram of an example system of the disclosure.

An example sensor system of the disclosure will now be described with respect to FIGS. 3 to 6. In this respect, FIG. 3 is a block diagram showing one example arrangement of a single-pixel object recognizer (SPOR) of the present disclosure, in this example shown with regards to performing facial recognition (and hence often referred to herein in as a single-pixel facial recognizer (SPFR)), but it should be understood that other object shape determination and recognition can be undertaken by the described system within other examples. Moreover, in this example the single-pixel sensor is integrated with a 2D image sensor such as a camera, although it should be understood that in other examples the single-pixel sensor may be used on its own.

As shown in FIG. 3 in this example the SPOR (SPFR) system is formed by three main sub-systems:
1. a Depth Signature Processor 1 measuring the depth variations for the illuminated portion of the face;
2. a 2D Camera 2 associating a visual image of the face; and
3. an Application Processor 3 processing the depth signature and visual cues to authenticate a user.

The operation of the Depth Signature Processor 1 is as follows. The SPFR Processor 1.11 initiates the operation by sending an activation signal to the Illumination Driver 1.1 which drives the laser diode (LD) or Vertical-cavity surface-emitting laser (VCSEL) 1.2 with the shortest possible pulse and optimum power level to cover the desired area. It also needs to guarantee a good optical signal integrity. In the simplest form the Illumination Driver 1.1 can be a Gallium Nitride field-effect transistor (GaN-FET) with passive current limiting, whereas a more sophisticated implementation would be a fast high-current digital-to-analog converter (DAC) where it is possible to select the LD or vertical-cavity surface-emitting laser (VCSEL) peak activation current. Because of the fast di/dt, the Illumination Driver 1.1 and LD/VCSEL are ideally co-packaged or use direct bonding to minimize the parasitic inductance.

The optical pulse generated by the LD/VCSEL 1.2 is split into two paths, a first path b1 is created by the waveguide 1.13 and will be used as signal reference detected by photodetector 1.7 and amplified by trans-impedance amplifier (TIA) 1.8. A second path b2 is directed to a light diffuser 1.3 which emits light with a sufficient angle to cover the subject face area 4.1. A light diffuser 1.3 can be integrated in the LD/VCSEL or the emission characteristics are such that a diffuser is not needed.

Light reflected from the illuminated area 4.1 is captured by a photodetector 1.5 such as PD, APD and amplified by TIA 1.6, reference and measured signals are mux-ed 1.9, and the signal selected by the SPFR Processor 1.11 is then digitized by a Fast Analog-to-Digital Converter (ADC) 1.10 (e.g., high speed ADC).

The digitized signal is finally processed by the SPFR Processor 1.11 which stores samples of waveforms in a dedicated memory 1.12. Because of the signal variability the signature waveform may be acquired multiple times and filtered before final processing. The final processing involves calculating the object nominal distance, normalizing reference and measured digitized signal, time aligning, and de-convolution. The result is the depth signature for a specific object.

For additional security the SPFR processor 1.11 may also encrypt the depth signature data sent to the Application Processor 3.

The operation of the 2D Camera 2 is as follows. The high resolution imaging sensor 2.1 streams the video information captured and sends to the Application Processor 3 through the 2D Imager Process and Control 2.4. In most cases this element is part of a camera module already available in a computing system (Smartphone, tablet, Laptop, etc.). In other cases this can be a dedicated imager such as complementary metal-oxide (CMOS) camera which can be Red Green Blue (RGB) and/or Infrared (IR) sensitive.

The 2D Camera 2 may have image stabilization formed by driver 2.5 and actuators 2.2 (e.g., based on a combined piezo, voice coil motor (VCM) actuator) to detect and correct shaking while performing an authentication process. In addition the 2D Camera system may have a white and/or IR illuminator 2.6 and driver 2.7 used in low light conditions. For additional security 2.4 encrypts the video data sent to the Application Processor 3.

The operation of the Application Processor 3 is to perform the following three functions:

Control the Facial Authentication process and learning
Collect samples of Depth signature from the Depth Signature Processor 1, and 2D snapshots from the 2D Camera 2
Perform the object identification or authentication using an algorithm (e.g. a machine learning algorithm)

Figure 4:
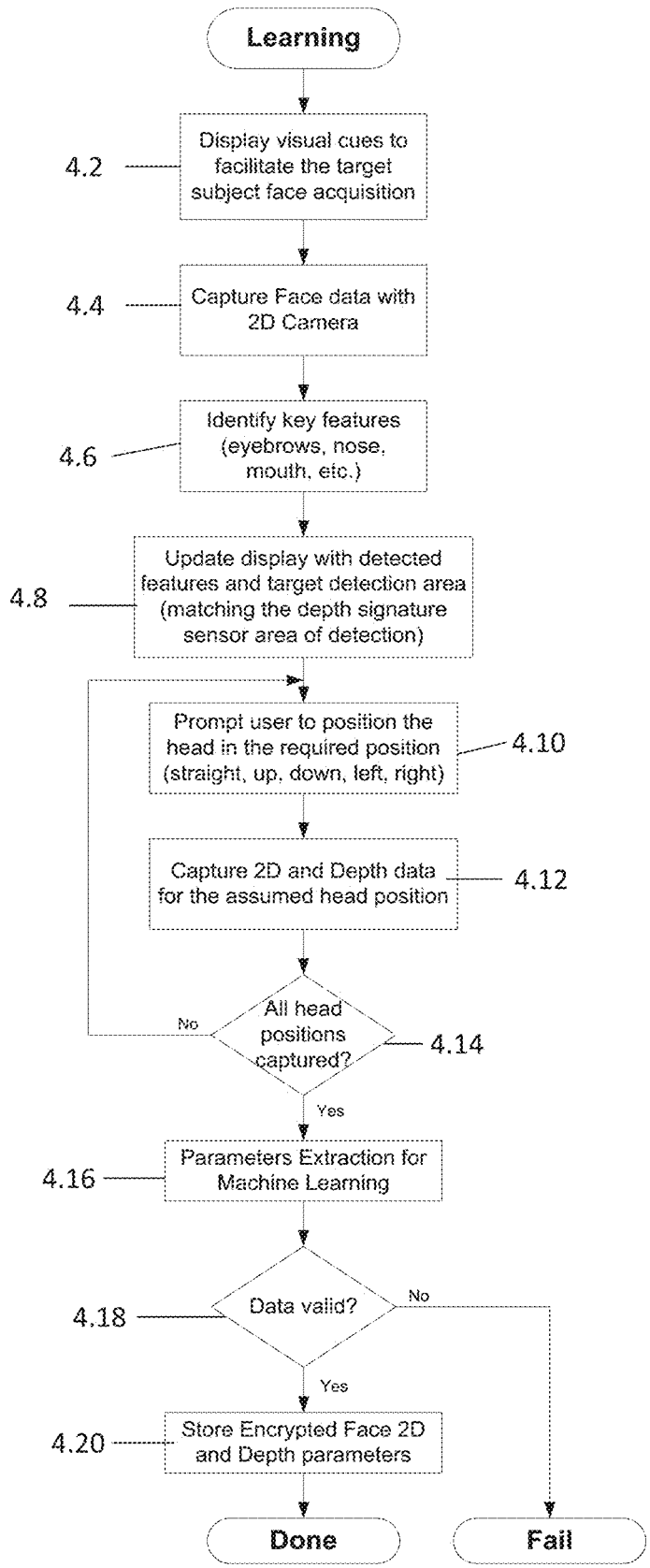
FIG. 4 is a flow diagram illustrating operation or parts of the system of an example of the disclosure.
Figure 5:
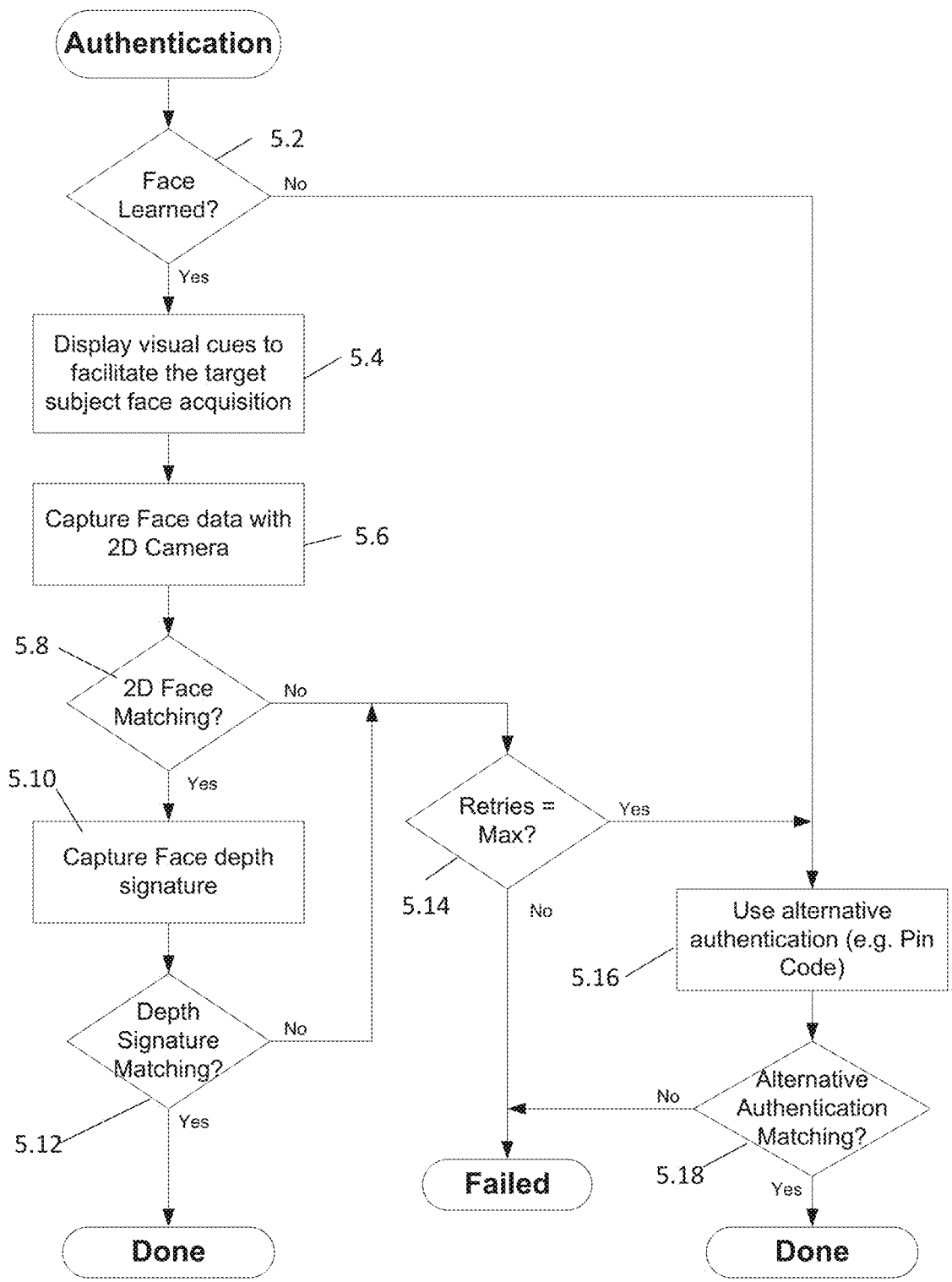
FIG. 5 is a further flow diagram illustrating the operation of part of the system of an example of the disclosure.
Figure 6:
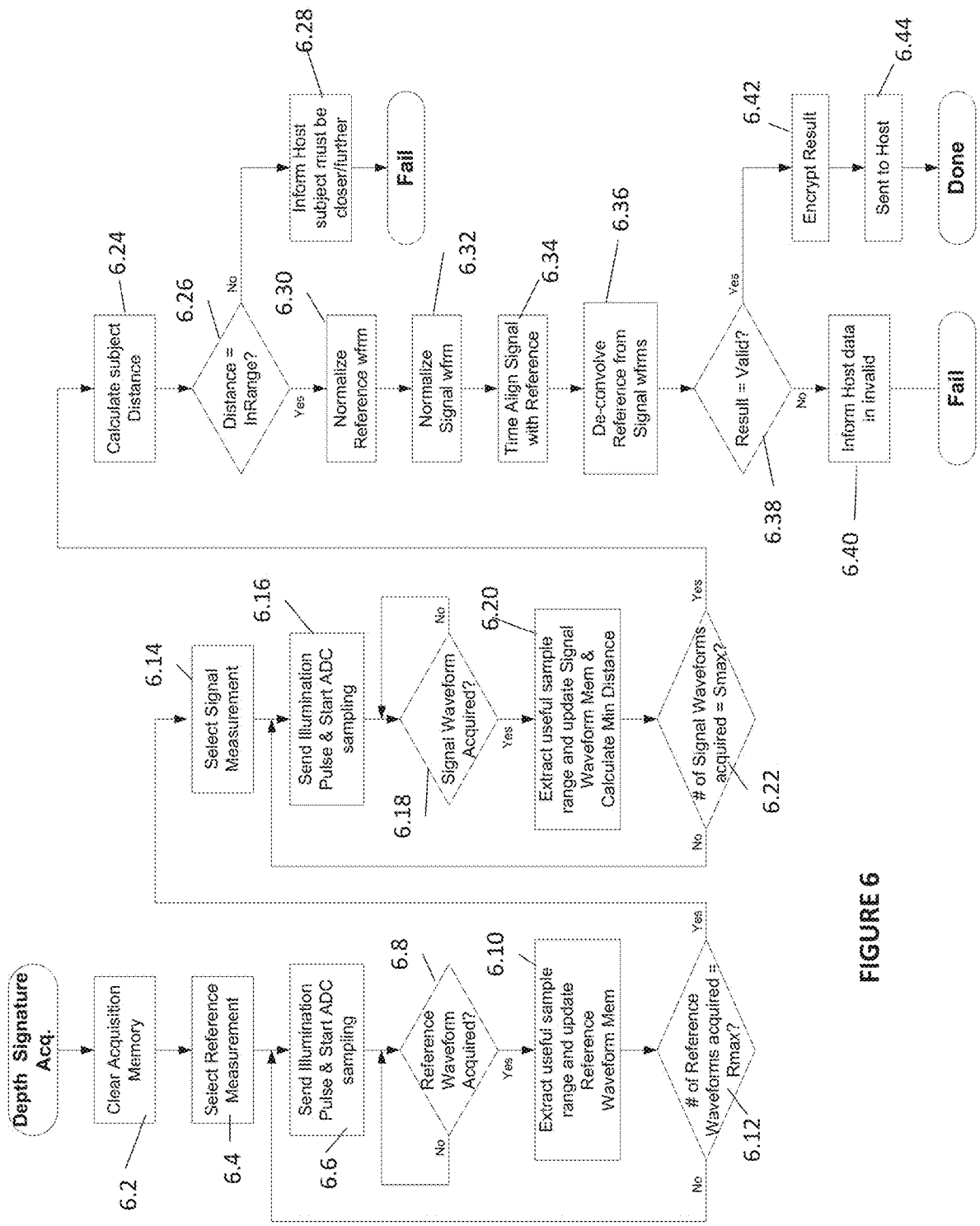
FIG. 6 is a flow diagram illustrating the operation or parts of the system of an example of the disclosure.

FIGS. 4, 5, and 6 give further details of the operation of the software running on the application processor 3 to help perform the above.

FIG. 4 illustrates the process undertaken by the application processor and the facial recognition algorithm therein in order to learn a new subject. Firstly, at 4.2 the program acts to cause a smartphone or the like on which the system is deployed to display on its display screen visual cues to facilitate the target subject face acquisition. Then, once the subject user is looking at the camera, face data in the form of a 2D image is captured with the 2D camera, at 4.4. Software within the application processor and facial recognition algorithm then identifies key features within the 2D image, such as eyebrows, nose, mouth, eye pupils, and the like using known image recognition techniques. For example, eye pupils can be easily determined from images by color thresholding the image to look for small black circles. Next, at 4.8, the display of the smart phone or other device into which the system is incorporated is updated to illustrate the detection features and the target detection area which matches the depth signature sensor area of the detection. Prompts are then shown to the user to position the head in the required position, at 4.10 i.e. by informing the user as to whether to look at the screen straight, or to raise or lower their head, or move it from left to right. Once the user is looking appropriately at the 2D sensor and depth signature sensor, at 4.12 2D image data and depth data is captured for the assumed head position. At 4.14 an evaluation is then undertaken as to whether all desired head positions for which data is required to be captured have been undertaken, and if not processing proceeds back to 4.10, wherein the user is prompted to assume a slightly different head position. This loop of actions 4.10, 4.12, and 4.14 is repeated until all desired head positions for the user have been captured.

At this point in time, therefore, the application processor has captured, via the 2D camera and the depth signature processor, both image data relating to the user's face, as well as depth signature data related to the user's face, with multiple sets of both sets of data being captured corresponding to slightly different angles and positions of the head. This data can then be applied to a parameter extraction process to determine key parameters of the data, and those parameters, once validated at 4.18, can then be encrypted and stored in a mathematical template at 4.20. If no valid parameters can be extracted, then the process fails and a message is shown to the user. Parameter extraction from the captured time traces to generate user depth signature traces for use by the application processor for matching purposes is described in more detail later with respect to FIG. 14.

Assuming that the learning process of FIG. 4 has been undertaken, and that data corresponding to a particular user to be detected is then stored within the application processor, FIG. 5 illustrates the overall user authentication process to identify or authenticate the user using the system of FIG. 3. The first part of FIG. 5 is to determine whether in fact any facial data has been learned by the system, for example using the process of FIG. 4. If no facial data or facial template is stored in the application processor, then it is necessary to use an alternative authentication mode, such as a pin code at 5.16, which is determined whether it then matches at 5.18. However, if the application processor does store facial data for a user (e.g. in the form of 2D images and depth signature time traces), then at 5.4 the processor controls the device such as a smartphone or the like to display visual cues on its screen to facilitate the target subject face acquisition. These prompts can be the same visual cues that were used at 4.2 of the learning process of FIG. 4, in order to have the user position his face correctly with respect to the device. For example, the device might show on its screen an image of the user overlaid with reference marks, such that the user must then position his head with respect to the device such that particular parts of his face e.g. eyes, nose, or ears are overlaid onto the marks. In other examples, however, the displaying of visual cues may not be performed, and instead the process proceeds with the image data that the device is able to capture in any event.

Once the subject face is appropriately oriented with respect to the capturing device, facial image data is then captured using the 2D camera at 5.6. This image data is then fed to the application processor, and a 2D face matching algorithm, which may be conventional, is then used to try and match the face. If the 2D face matching algorithm is not able to return a positive result i.e. it is not able to recognize the user's face, then processing proceeds to 5.14, where an evaluation is made as to the number of times the user has tried to perform recognition. If the maximum number of retries has been obtained, then the alternative authentication mechanisms of 5.16 and 5.18 are then used and if these are not able to authenticate the user, then the authentication process fails. Conversely, if the alternative authentication method e.g. PIN code or the like is able to authenticate the user, then the authentication process returns that the user has been authenticated.

Returning to 5.8, however, if the 2D image captured by the 2D camera does match the user's face, then it is then necessary to determine whether the user's facial depth signature also matches. At 5.10, therefore, the face depth signature is then captured using the Depth Signature Processor 1, and the resulting time-based waveform is then fed to the application processor and matched to the depth signatures (or corresponding mathematical templates) stored therein. If the application processor is able to match the captured face depth signature with the stored depth signature for the user (above a certain matching threshold), then the user has been authenticated by both the 2D image capture and the depth signature processor, and hence can be authenticated as real. As discussed previously, the advantage of performing both 2D face matching using a 2D image from the camera, and face depth signature matching, is that greater security can be obtained as it is then not possible to fool the 2D image face matching process by simply displaying a photograph of the user to the camera. Instead, because depth signature information must also match, captured at the same time as the 2D image of the user, in order to authenticate the user the actual user having a three dimensional face must be present. Alternatively a lifelike mask of the user might also be used to attempt to spoof the system, but it would be understood that this is significantly more difficult to reproduce than a mere photograph.

The depth signature capture process 5.10 of FIG. 5 is shown in more detail in FIG. 6. In particular, FIG. 6 illustrates the steps performed by the depth signature processor 1 in obtaining a depth signature signal trace to send to the application processor for recognition. The steps of FIG. 6 are controlled by the SPFR processor 1.11 controlling the other components of the depth signature processor as appropriate.

Turning to FIG. 6, firstly at 6.2 the acquisition memory 1.12 is cleared, and then the first step that must be performed by the depth signature processor is to obtain reference measurements of the response of the laser diode or VCSEL to its drive signal. The reference measurement mode is selected at 6.4, and involves sending illumination pulses from the illumination driver 1.1 to the laser diode or VCSEL 1.2, and sampling using the fast ADC 1.10. The light that is produced by the laser diode or VCSEL using the reference detector 1.7, via the trans-impedance amplifier 1.8, which feeds into the fast ADC via the multiplexer (MUX) 1.9. That is, at 6.6 an illumination pulse is sent via the illumination driver 1.1 to the laser diode 1.2, and the resulting light pulse from the laser diode is detected by reference detector 1.7 and sampled via the TIA 1.8 and MUX 1.9 by the fast ADC 1.10, at 6.8. At 6.10 the SPFR processor 1.1 then extracts the useful sample from the information received from the ADC and updates the reference waveform memory. It then performs an evaluation as to whether the required number of reference waveforms have been obtained and if further reference waveforms are required i.e. the number of reference waveforms $R_{MAX}$ has not been met then processing returns back to 6.6, and a further reference waveform is acquired. This process repeats until the desired number of reference waveforms $R_{MAX}$ have been obtained and stored in the reference waveform memory.

Figure 8:
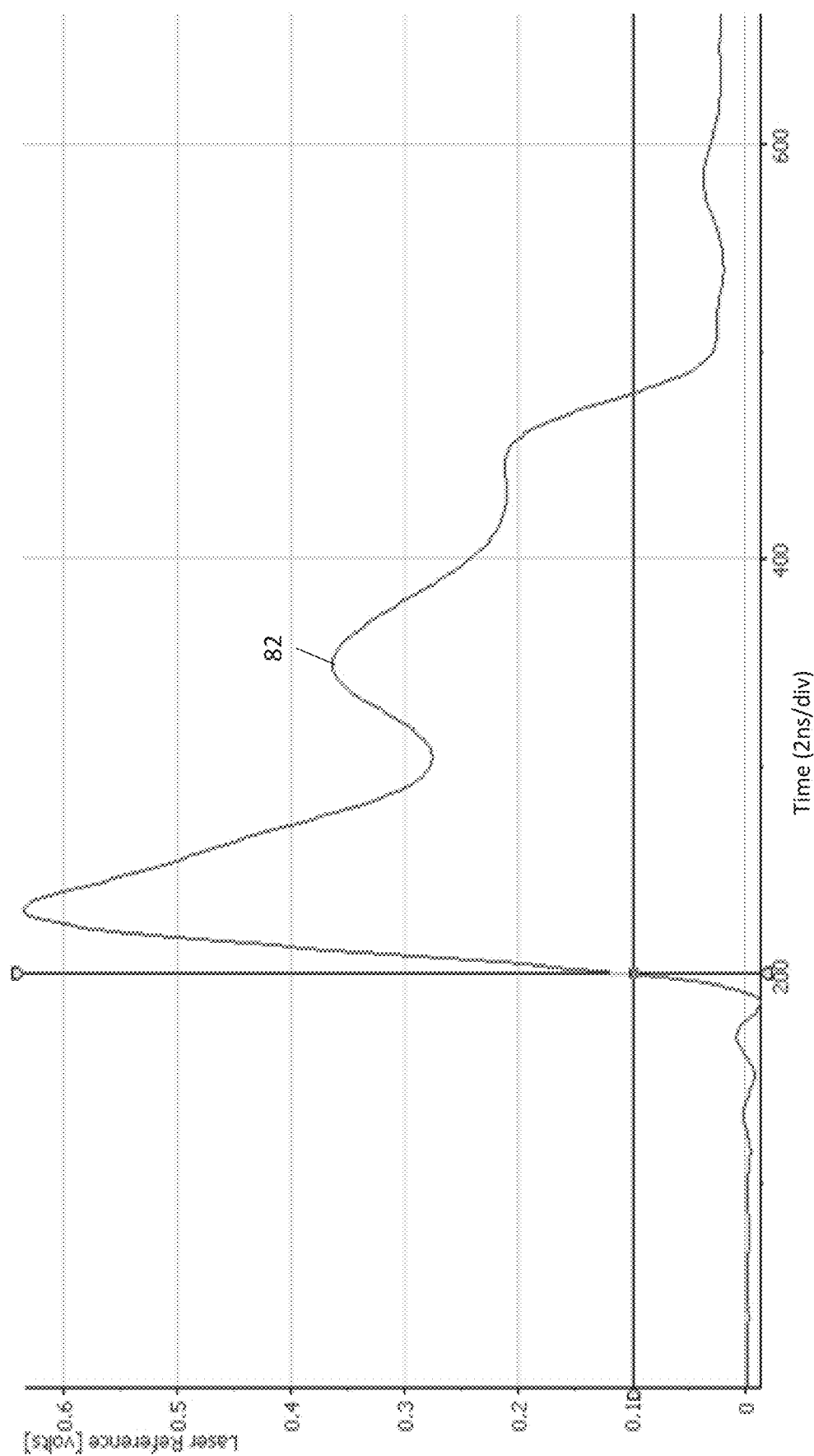
FIG. 8 is a graph illustrating a related photodetector response used in an example of the disclosure.

Regarding the need for reference waveforms, there can arise optical signal distortion due to hardware limitations when transmitting a light pulse, and where such distortion does arise it can be helpful to normalize it out. For example, a reference waveform is shown in FIG. 8. Here, the reference waveform 82 shows that the response of the laser diode or VCSEL to its drive pulses is non-linear, and exhibits large ringing. This is because of the fast changing current di/dt with respect to time within the laser diode or VCSEL due to the drive pulses and circuit parasitics within the laser diode. The ringing in the response of the laser diode or VCSEL to its drive pulse is manifested by changes in the light output by the laser diode or VCSEL during the pulse duration, and hence it is necessary to record this ringing in the laser diode or VCSEL output as a reference signal so that it can then be used to normalize the reflected light signal collected by photo detector 1.5 later. If this normalization was not performed then it would be almost impossible to use the reflected light from the illumination pulse to recognize or characterize the subject object, as the differences in light amplitude and pulse shape caused by system non-linearity could be mistaken as being caused by features of the object being illuminated e.g. the subject user's face.

Returning to FIG. 6, once the reference waveforms of the laser diode or VCSEL response have been collected, it is then possible to start collecting reflected waveforms from the subject user 4. Therefore, at 6.14 a signal measurement mode is selected by the SPFR processor, and at 6.16 illumination pulses are sent to the laser diode or VCSEL 1.2 from the illumination driver 1.1, and the ADC again starts sampling. This time, however, the ADC is sampling signals received from photo detector 1.5 via trans-impedance amplifier 1.6 and MUX 1.9, and the sampled signals therefore represent the time trace of the output of the photodetector 1.5 in response to reflected light from the subject's face in response to the illuminating light pulses. At 6.18 the SPFR processor collects waveforms from the photodetector 1.5 via the TIA 1.6, MUX 1.9, and ADC 1.10, and then extracts useful samples and updates the signal waveform memory 1.12 at 6.20. The SPFR processor also calculates the minimum distance required for successful detection, measuring the time-of-flight information, and then performs an evaluation as to whether the number of signal waveforms that have been acquired is equal to the desired number $S_{MAX}$, and if not, controls the depth signature processor circuitry to repeat the above process to acquire more samples. However, once the required number of signal waveforms have been acquired, then the SPFR processor 1.11 controls the circuitry to stop collecting signal waveforms, and then proceeds to analyze the waveforms that have been collected and stored in the memory 1.12. This is performed from 6.24.

Figure 12:
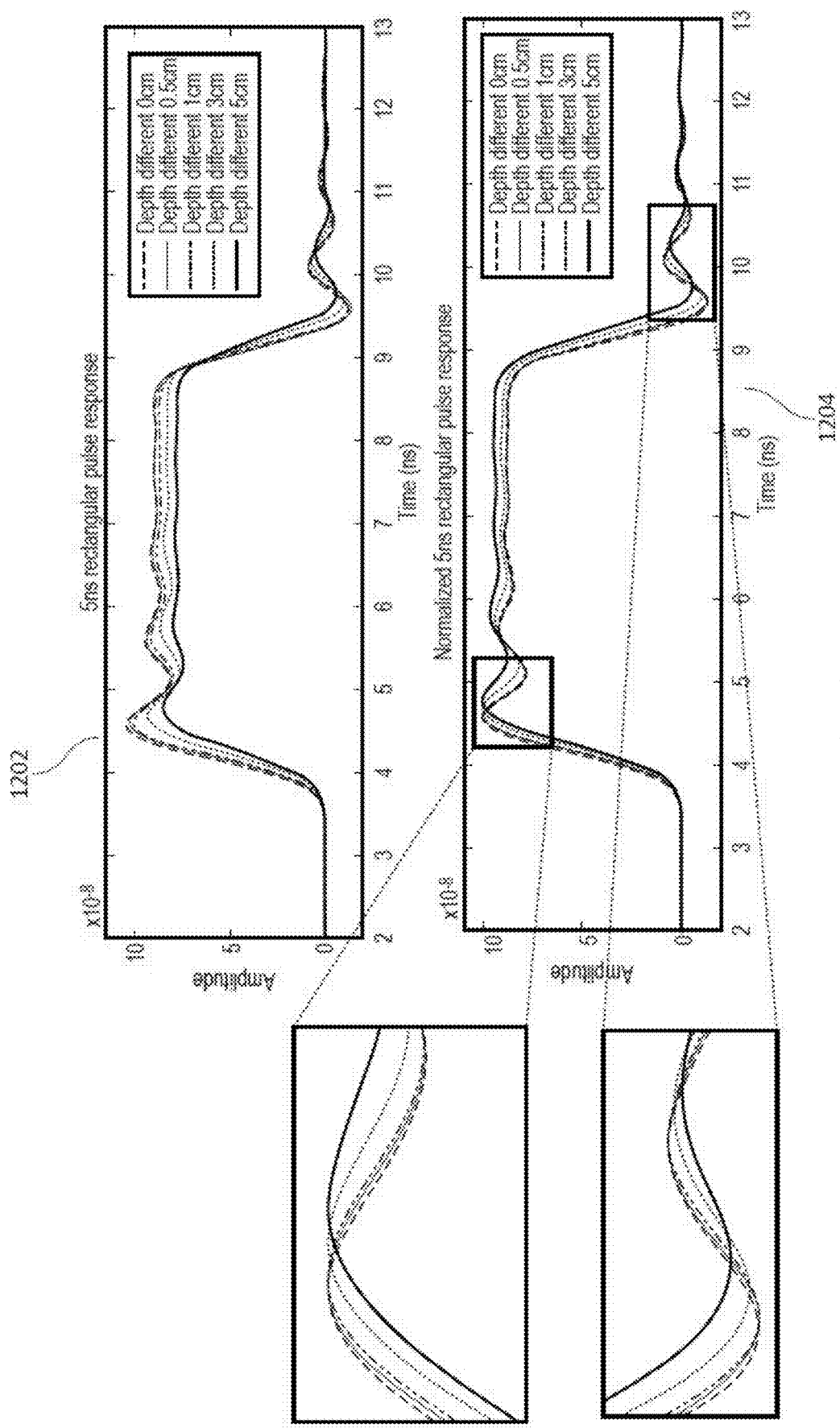
FIG. 12 is a simulated bandwidth limited pulse response showing as-received and normalized versions of the response illustrating the operation of an example of the disclosure.

More particularly, at 6.24 the SPFR processor calculates from the stored waveforms whether the waveforms contain sufficient characterizing data i.e. whether the subject was close enough. In this respect, the distance to the user is calculated by measuring the time-of-flight, which is the time difference between the rising edge of the reference waveform and the rising edge of the received pulse. If it is determined that the stored waveforms indicate that the distance was out of range, then at 6.28 a message is displayed to the subject user that he must be closer to the device, and then signal collection can be repeated. Conversely, if the reference waveforms indicate that the subject was in range, then at 6.30 and 6.32 the reference waveform and received signal waveforms are normalized, and time aligned at 6.34. At 6.36 the reference wave form is then de-convolved from the signal waveform, which has the result of removing the contribution of system non-linearity (or artefacts such as the previously described ringing response) of the laser diode or VCSEL from the received signal. FIG. 12 illustrates example simulated waveforms, with the upper trace 1202 of FIG. 12 illustrating example rectangular pulse responses for simulated surfaces with different depth differences as steps, whereas the lower trace 1204 shows the same date but normalized to remove the effects of the artefacts of the laser diode or VCSEL.

Processing then proceeds to 6.38 where a validation check is performed on the de-convolved data, and if the data looks valid it is then encrypted at 6.42, and then sent to the application processor at 6.44 for matching to a user. Conversely, if the data cannot be validated, then at 6.40 the application processor is informed that the data is invalid, and the matching process is not performed.

With the above process, therefore, the depth signature processor is able to capture time trace waveforms characteristic of the shape of the face of the subject user from which the light pulses are reflected. In order to accommodate artefacts within the laser diode, those pulses are normalized with respect to a reference waveform captured from the laser diode such that the shape of the waveforms is then dependent almost solely upon the shape of the object from which the light pulses have reflected, rather than errors introduced within the circuitry. As such, the time-based waveform traces can then be used by the application processor as recognition signals for the subject user.

Figure 7:
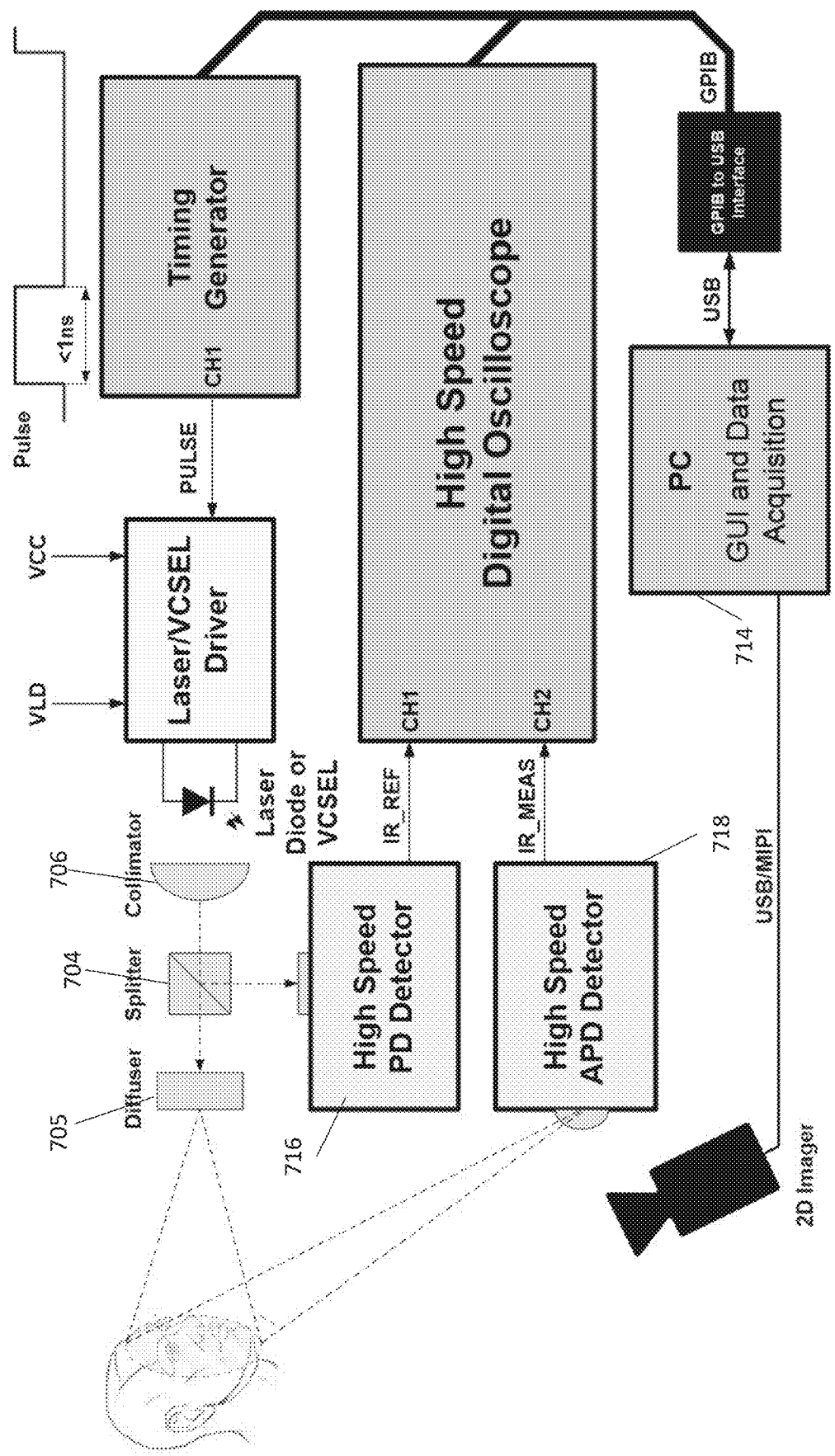
FIG. 7 is a system block diagram of a further example of the disclosure.

In order to validate the concept a test setup was built based on off the shelf components and instrumentation. FIG. 7 shows the block diagram for this setup.

As shown in FIG. 7, LD pulse generation is provided by a digital signal generator 712 creating a pulse as short as 1 ns. This signal is applied to a LD board 710 containing the driver and laser diode operating at 850 nm or other near infrared (NIR) frequencies. The max LD peak current is set by resistor and can be controlled by the voltage applied to the LD Anode, in our test this voltage is set to 18V corresponding to an LD peak current of 8 A (~5 W optical peak power). Because of the fast di/dt and inevitable circuit parasitic it was not possible to generate a clean rectangular pulse, so the LD driving signal has large ringing as shown in FIG. 8, and discussed above.

Light exiting the LD Module 708/710 is collimated by the lens 706, the collimated beam is 50/50 split by 704, and one beam is directed to a high speed photodiode DET08CL 716 to be used as the reference signal acquired in CH1 of a high speed digital oscilloscope 714. The other beam from the splitter 704 passes through a 20° diffuser 705 set to cover part of the face of the subject user placed at ~30 cm from the emitter. The illuminating light then reflects from across the face of the subject.

Light reflected from the subject is detected by a fast APD 718 and the amplified signal from the fast APD 708 is acquired on CH2 of the high-speed digital oscilloscope 714. The scope is GPIB connected to a laptop computer acquiring reference and measured waveforms through a PC program which processes the data by normalizing, time aligning and de-convolving the acquired signal, storing the results in a database as well as the raw waveform data for post processing. The normalizing, time aligning and de-convolving are as described previously in respect of FIG. 7. The processing that is then performed to recognize a subject user from the obtained waveform traces is described below.

Figure 15:
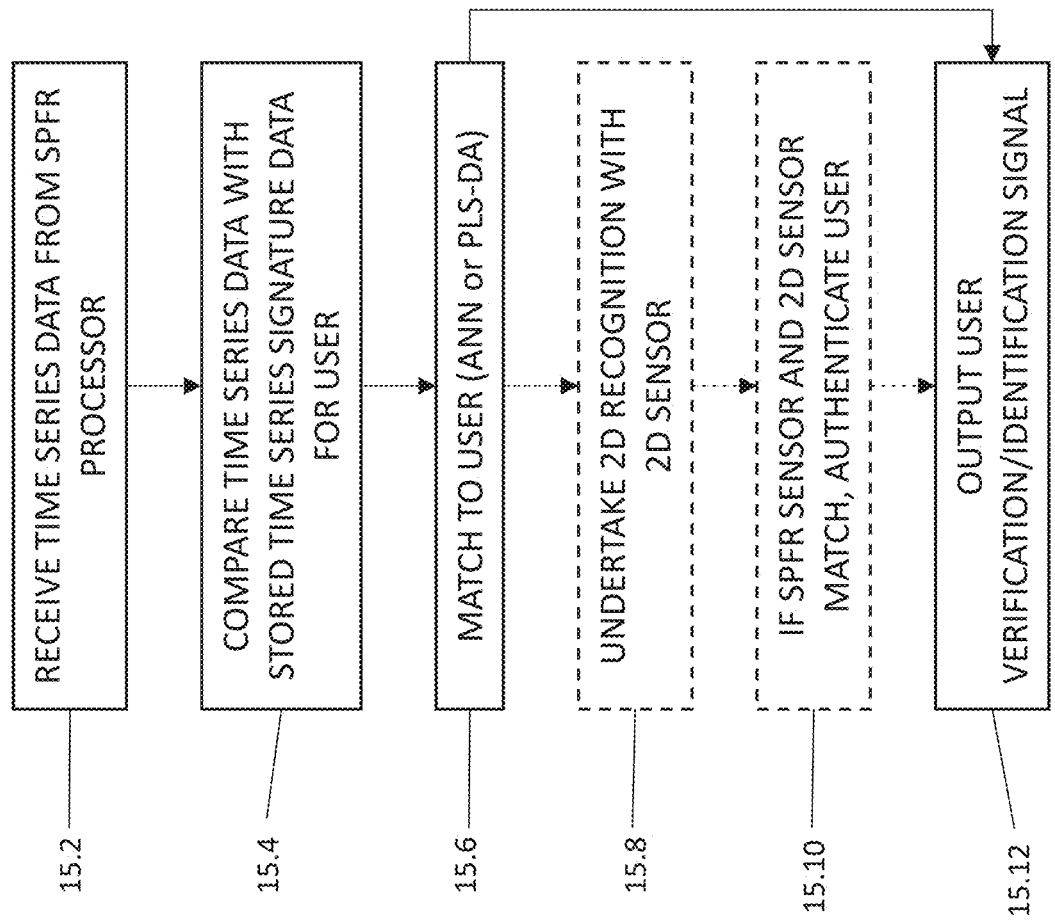
FIG. 15 is a flow diagram illustrating a recognition process used in an example of the disclosure.

FIG. 15 shows at a high level the process performed by the application processor 3 to recognize or characterize the subject 4 from the reflection time traces. At 15.2 the time-series data is received from the SPFR processor 1.11, and then at 15.4 the application processor acts to compare the time-series data (or corresponding template) with previously stored time-series signature data (or template) for the alleged subject user trying to be authenticated, or alternatively with all subject users for which time signature traces have been stored. If a match to the stored time-series data is made then the user subject to which the match was made is authenticated, at 15.6. When used also in conjunction with a 2D image sensor such as a camera module then at 15.8 the application processor can also undertake 2D image recognition, with the processor then authenticating the user if both the SPFR sensor data and the 2D image data match (above a threshold set by the system administrator). If the user is authenticated then the application processor outputs a verification/identification signal to its host device. The receipt of this verification or identification signal by the host device may then cause the device to perform an action, for example to unlock to permit use of the device by the user.

Figure 13:
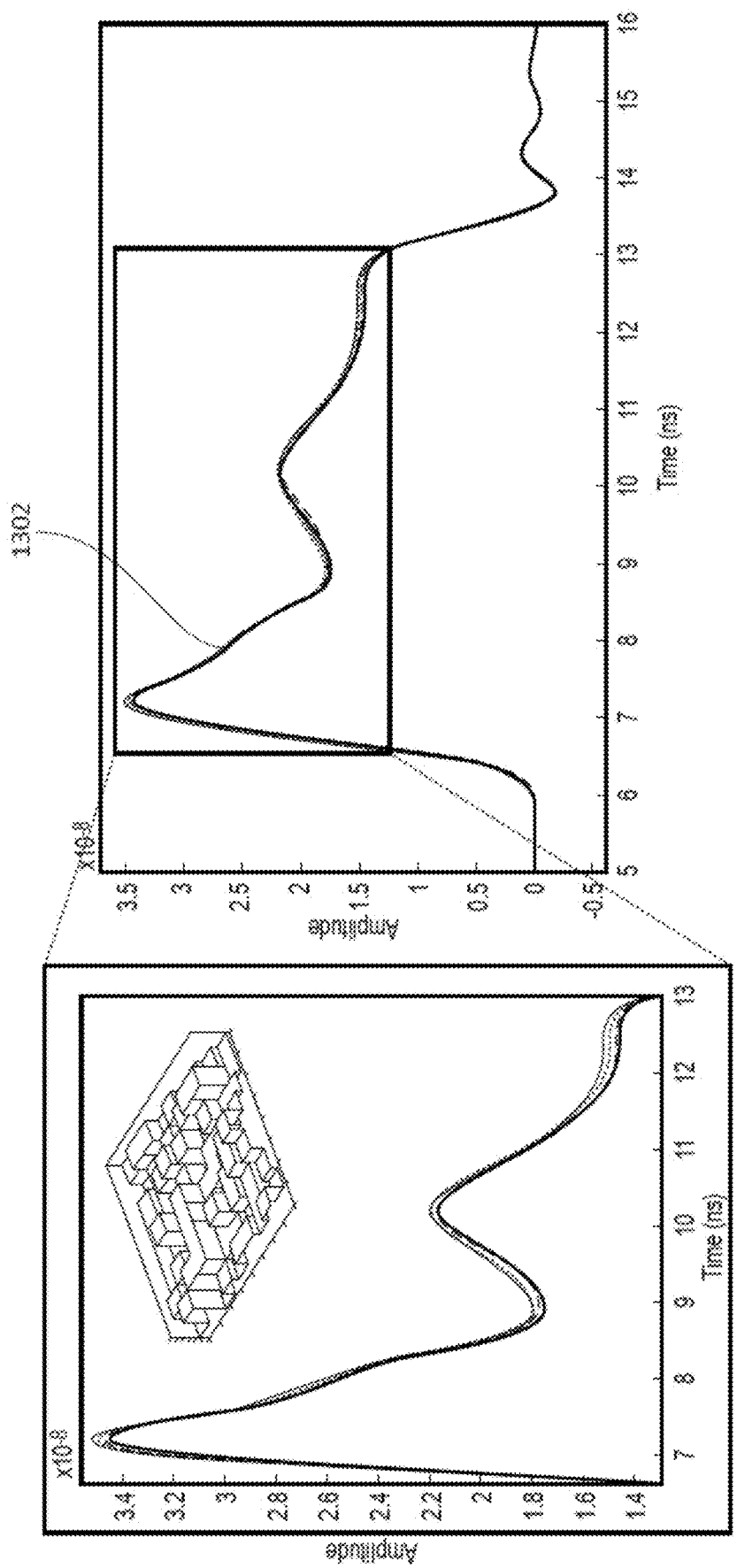
FIG. 13 is a simulated response characteristic from an example of the disclosure.

In terms of the time trace matching that needs to be performed by the application processor, as mentioned this is performed on the one-dimensional time trace signal captured by the PD, APD or SPAD. To understand this better a mathematical model was developed to help understand the complexity of the signal response reflected from an object with variable depths. To simplify the modelling the object surface was divided into m×n elements, and the reflectivity and scattering profile of each element was assumed to be the same (R=0.5, Reflectance). The distance difference caused by different angle of each element was considered, as was also the reflection amplitude difference caused by different angle for each element. The simulation of the illumination then also considered variable pulse-width, and bandwidth from an ideal source or a real optical waveform measured on the test setup. The final result is the integration of the response from all elements in terms of amplitude and time. Example idealized (non-bandwidth limited, picosecond pulse) results are shown in FIGS. 9 to 11, whereas bandwidth limited and normalized results from nanosecond pulses are shown in FIGS. 12 and 13.

Figure 9A:
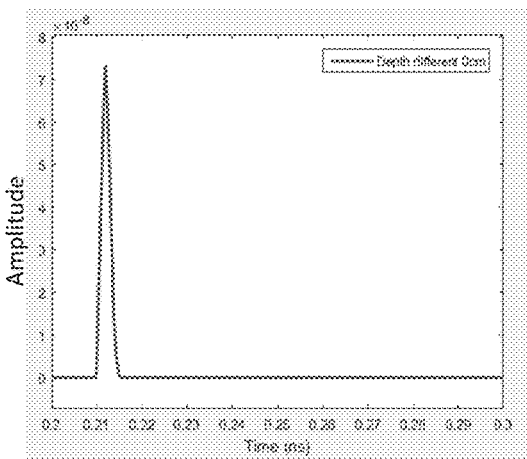
FIGS. 9, 10, and 11 are simulated responses and associated determined shapes in a theoretical example of the disclosure.
Figure 9B:
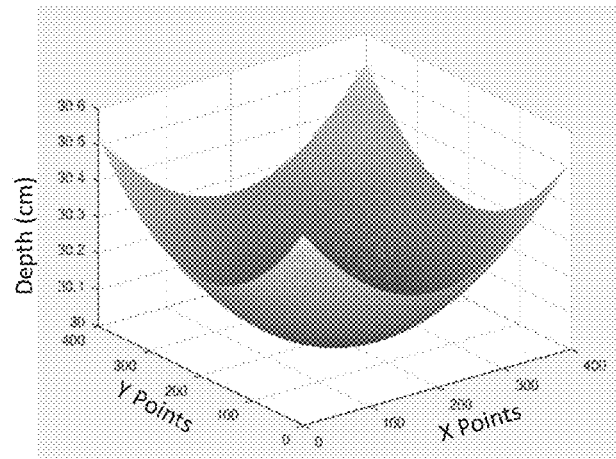
Figure 10A:
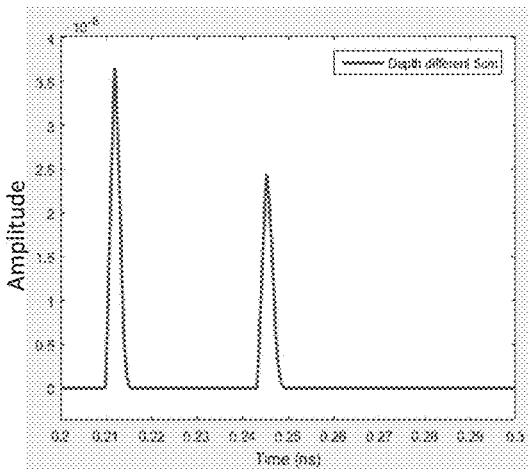
Figure 10B:
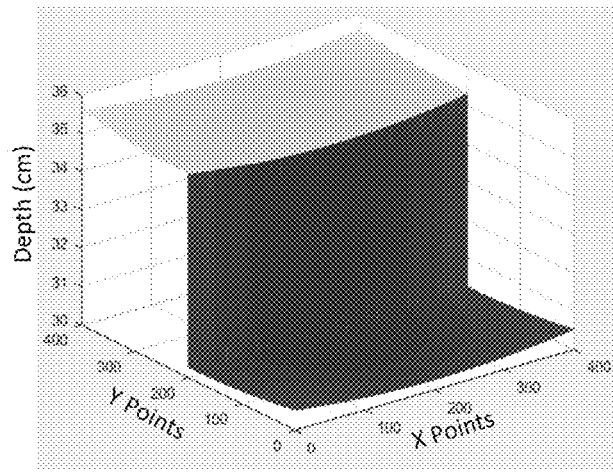
Figure 11A:
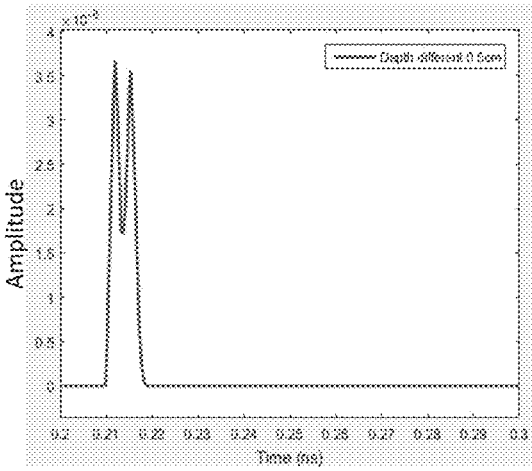
Figure 11B:
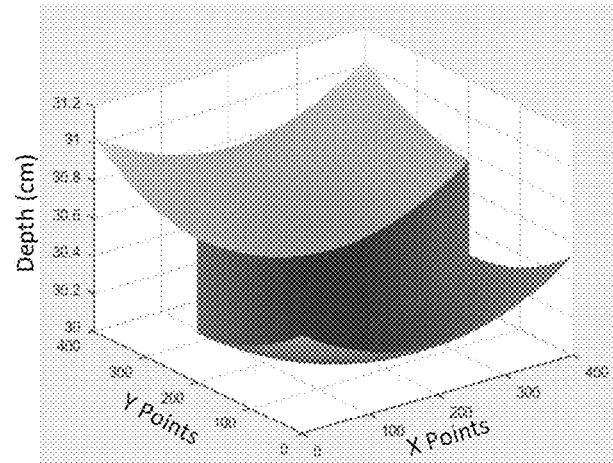

Referring briefly first to the idealized simulations of FIGS. 9 to 11, while not representing real responses, these illustrate the theoretical discrimination ability of the technique. FIG. 9 illustrates the theoretical response of a flat surface, as a reference. From the left hand plot it will be seen that the flat response with an unlimited bandwidth detector and idealized picosecond illumination pulse gives a single reflection peak, as would be expected. FIG. 10 then illustrates an idealized surface with a 5 cm step difference, from which it can be seen the 5 cm depth difference leads to two distinct output pulses 0.3 ns apart in the time trace. FIG. 11 shows a smaller depth difference of just 0.5 cm step, but again, in the idealized simulation two peaks are detectable in the trace, representative of the step. In reality, however, due to bandwidth limitations in the PD, while the 5 cm step of FIG. 10 may be detectable, the 0.5 cm step will usually be beyond the resolution of the PD, due to bandwidth limitations causing the peaks to merge.

However, while the above applies to idealized simulations, in actual use there is no need to detect the difference of each depth as shown for the idealized picosecond pulse case. Instead, the reflections from the different spots with different depths merge to form one single waveform. This is shown in FIG. 13, where a multi-faceted surface was simulated with a more realistic 5 ns pulse. As will be seen, from the multi-faceted surface the different reflection traces effectively blend together into a single trace, which can then be used as a characteristic time trace for the object.

Figure 14:
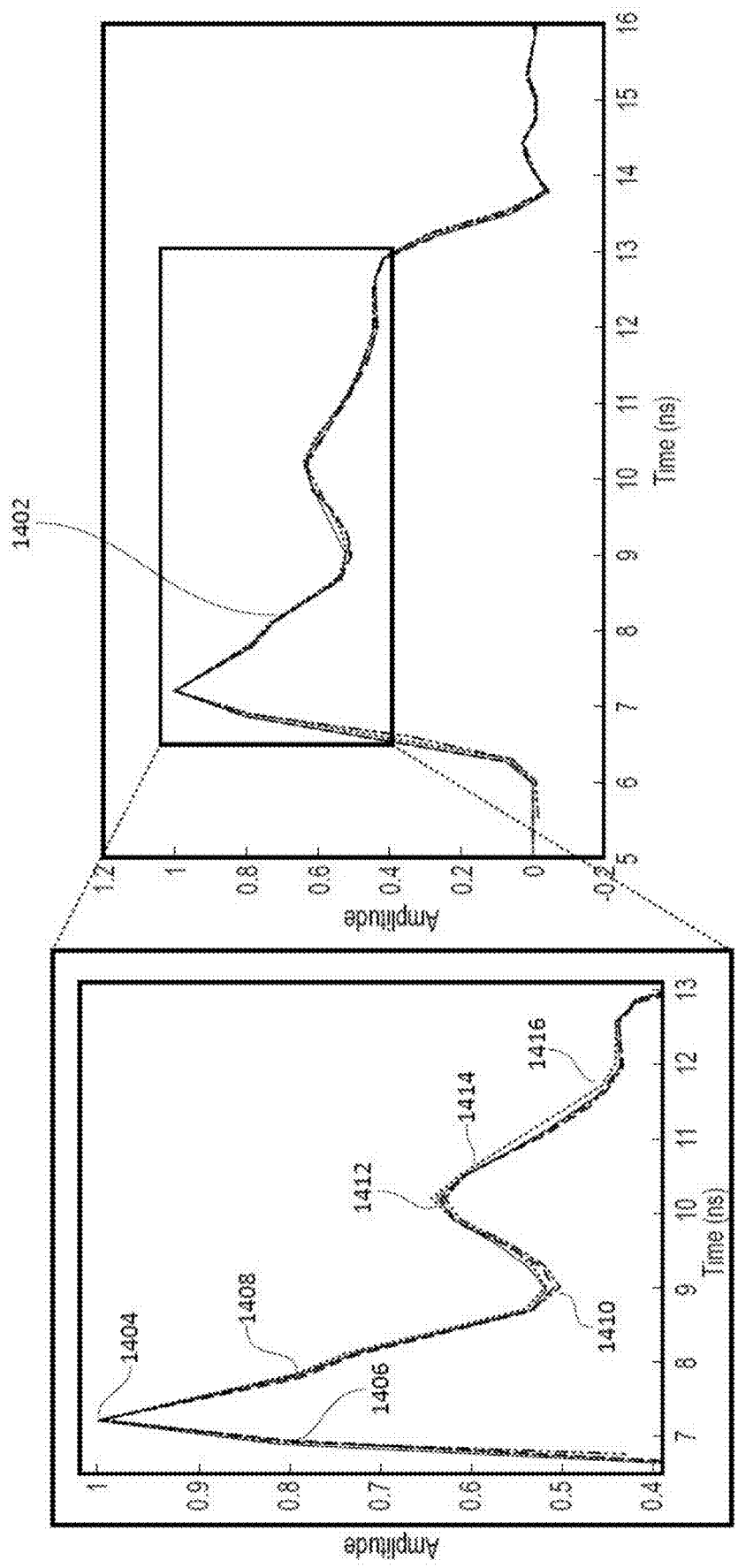
FIG. 14 is a real response characteristic, after digitization, from an example of the disclosure illustrating the characterization of the response curves.

The next issue then arises of how to characterize the time trace. In this respect, the issue is that the difference on the waveform for different objects is small, and will mostly reflect on the amplitude, which itself is unstable for a real system. Again, since the difference is very small, the requirement on the digitizer would be very high. However, a 3 GHz sampling rate should provide enough data points, and in a real scenario, the reflectivity and scattering profiles of different spots will be different, which should provide more difference. FIG. 14 illustrates a sampled and interpolated trace, wherein the trace of FIG. 13 has been sampled at 3 GHz (to give three samples per ns). Example sample points are therefore shown at 1404, 1406, 1408, 1410, 1412, 1414, and 1416, and the waveform is recreated for matching purposes in the application processor 3 by linear interpolation from sample point to sample point. Of course, in other examples different interpolation techniques to recreate the waveform for matching may be used, taking the sample points as input.

Given the above, and returning back to FIG. 15, as mentioned at 15.6 the application processor matches the time traces (represented as a series of samples, as described above) to stored time traces for particular registered users. In terms of how this matching is performed, proof of concept systems have implemented machine learning algorithms for user identification, and in particular two particular types of matching algorithm have been used:

1. ANN matching algorithm—maps time-series data directly to input neurons, 1 or more hidden layers, and an output layer to provide Go/NoGo authentication or identification of individuals from data set
2. Partial Least Squares Discriminant Analysis (PLS-DA) algorithm—uses PCA to reduce dimensionality of the time-series data, before implementing regression. Provides similar output as the ANN example.

When tested on a sample size of 32 people the initial results show that the system can easily differentiate a real person vs a 2D picture, and that the neural network matching achieves ~99% recognition rate for individuals in the data set, with PLS-DA matching slightly lower. Of course, in other examples different matching algorithms may also be used, as will be known by the intended reader.

In summary, examples of the present disclosure provide a single-pixel sensor system that has the potential to improve the recognition rate of an accompanying 2D system by up to 100×, especially in challenging conditions (e.g. poor lighting, cosmetic alterations, etc), or to be used as a standalone system. Moreover, when used with a 2-D sensor then adding the 3D depth sensing capabilities of the single-pixel sensor system makes the overall system less prone to simple spoofing (e.g. by using a photo or video feed of the user subject in place of the actual person). Moreover, the single-pixel sensor system is much simpler and less costly than other 3D imaging systems, such as structured light or time-of flight scanners.

Various modifications may be made to the above examples to provide further examples. In one further example, a plurality of single-pixel sensors may be provided, arranged either in a one-dimensional line, or a two-dimensional array. The advantage of providing plural such sensors is not that it then becomes possible to image the subject using them, but that multiple measurements can then be obtained in parallel from the same illumination pulse. This will reduce the number of calibration and measurement illumination pulses that are needed for operation. In addition, each single-pixel sensor of a plurality of sensors will have a slightly different FOV of the subject user due to the slightly different ray paths light will take from the illumination diode to the user and then back to the different sensors in the array. This will mean that each single-pixel sensor in the array will capture a slightly different one-dimensional time trace representative of the light reflected back to it from its own FOV. The set of synchronous time traces thus obtained for each separate illumination flash provides a further signature characteristic of the subject user or object, which set can be used to enhance discrimination or recognition of the object.

In a further example, where the illumination diode or VCSEL has a clean and predictable response to its drive signal (i.e. does not exhibit ringing or other unpredictable artefacts), then it may not be necessary to include the reference channel componentry, or to conduct the reference normalization steps described in the examples above. Excluding such features where possible will result in a simpler, and hence less costly implementation.

In some examples, apparatuses may comprise means for implementing/carrying out any one of the methods described herein.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims (if any) or examples described herein. The specifications apply only to one non-limiting example and, accordingly, they should be construed as such. In the foregoing description, example embodiments have been described with reference to particular processor and/or component arrangements. Various modifications and changes may be made to such embodiments without departing from the scope of the appended claims (if any) or examples described herein. The description and drawings are, accordingly, to be regarded in an illustrative rather than in a restrictive sense.

Note that with the numerous examples provided herein, interaction may be described in terms of two, three, four, or more electrical components or parts. However, this has been done for purposes of clarity and example only. It should be appreciated that the system can be consolidated in any suitable manner. Along similar design alternatives, any of the illustrated components, modules, blocks, and elements of the Figures may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the Figures and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. It is also important to note that the functions described herein illustrate only some of the possible functions that may be executed by, or within, systems/circuits illustrated in the Figures. Some of these operations may be deleted or removed where appropriate, or these operations may be modified or changed considerably without departing from the scope of the present disclosure. In addition, the timing of these operations may be altered considerably. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure. Numerous other changes, substitutions, variations, alterations, and modifications may be ascertained to one skilled in the art and it is intended that the present disclosure encompass all such changes, substitutions, variations, alterations, and modifications as falling within the scope of the appended claims (if any) or examples described herein. Note that all optional features of the apparatus described above may also be implemented with respect to the method or process described herein and specifics in the examples may be used anywhere in one or more embodiments.

Various further modifications, whether by way of addition, deletion, or substitution may be made to the above mentioned examples to provide further examples, any and all of which are intended to be encompassed by the appended claims.

The claims herein have been presented in single dependency format suitable for filing at the USPTO, however it is to be understood that for the purposes of those jurisdictions that allow multiply dependent claiming, each claim can depend on any preceding claim of the same type, unless that is clearly technically infeasible.

What is claimed is:

1. A sensor for detecting an object; the sensor comprising:
    a light source arranged to emit a light pulse to illuminate a face of the object, wherein the light pulse has a duration of less than 5 nanoseconds;
    a diffuser to diffuse the light pulse across the face of the object;
    a photo detector arranged to detect light from the light pulse reflected from the object's face to generate a one-dimensional time-based reflection signal representative of properties of the object's face;
    a recognition processor arranged to receive the time-based reflection signature and to recognize the object in dependence on the time-based reflection signature, wherein the recognition processor is to store object-specific one-dimensional time-based signal trace data against which the time-based reflection signature is compared to recognize the object; and
    a processor arranged to receive signals representative of the one-dimensional time-based reflection signal and to generate a time-based reflection signature for the object in dependence thereon;
    wherein the object-specific one-dimensional time-based signal trace data comprises respective sets of samples of respective object-specific time-based signal traces that are to be captured during a training phase, and the recognition processor is to interpolate between the set of samples to recreate the object-specific time-based signal traces to match against.

2. The sensor according to claim 1 wherein the recognition processor utilizes machine learning techniques to recognize the object based on the time-based reflection signature.

3. The sensor according to claim 2, wherein the machine learning techniques include at least one of:
    a) principal component analysis; and/or
    b) one or more neural networks.

4. The sensor according to claim 1, and further comprising reference channel componentry arranged to receive at least a portion of the light pulse directly from the light source to provide a reference signal, the processor being further arranged to normalize the one-dimensional time-based reflection signal in dependence on the reference signal to account for unwanted characteristics in the light pulse.

5. The sensor according to claim 4, wherein the light source has a ringing characteristic, and the reference channel componentry comprises a reference photodetector arranged to detect the ringing characteristic, the processor being further arranged to receive a signal generated by the reference photodetector in response to the ringing characteristic and to normalize the one-dimensional time-based reflection signal to remove artifacts therein caused by the ringing.

6. The sensor according to claim 1, and further comprising a two-dimensional spatial based recognition system arranged to capture a two-dimensional image of the face of the object and to undertake a recognition of the object in dependence thereon, the recognition processor generating an output signal indicative of successful recognition of the object in dependence on recognition of the object using both the two-dimensional image and the one-dimensional time-based reflection signal.

7. The sensor according to claim 1, wherein the object is a human subject, and the face of the object is the human subject's face.

8. The sensor according to claim 1, wherein the recognition processor is further to store a mathematical template against which a template that corresponds to the time-based reflection signature is compared to recognize the object.

9. A sensor for detecting an object; the sensor comprising:
    a light source arranged to emit a light pulse to illuminate a face of the object, wherein the light pulse has a duration of less than 5 nanoseconds;
    a diffuser to diffuse the light pulse across the face of the object;
    a photo detector arranged to detect light from the light pulse reflected from the object's face to generate a one-dimensional time-based reflection signal representative of properties of the object's face;
    a processor arranged to receive signals representative of the one-dimensional time-based reflection signal and to generate a time-based reflection signature for the object in dependence thereon; and
    reference channel componentry arranged to receive at least a portion of the light pulse directly from the light source to provide a reference signal, the processor being further arranged to normalize the one-dimensional time-based reflection signal in dependence on the reference signal to account for unwanted characteristics in the light pulse;
    wherein the light source has a ringing characteristic, and the reference channel componentry comprises a reference photodetector arranged to detect the ringing characteristic, the processor being further arranged to receive a signal generated by the reference photodetector in response to the ringing characteristic and to normalize the one-dimensional time-based reflection signal to remove artifacts therein caused by the ringing.

10. The sensor according to claim 9, and further comprising a recognition processor arranged to receive the time-based reflection signature and to recognize the object in dependence on the time-based reflection signature.

11. The sensor according to claim 10, wherein the recognition processor utilizes machine learning techniques to recognize the object based on the time-based reflection signature.

12. The sensor according to claim 11, wherein the machine learning techniques include at least one of:
    a) principal component analysis; and/or
    b) one or more neural networks.

13. The sensor according to claim 10, and further comprising a two-dimensional spatial based recognition system arranged to capture a two-dimensional image of the face of the object and to undertake a recognition of the object in dependence thereon, the recognition processor generating an output signal indicative of successful recognition of the object in dependence on recognition of the object using both the two-dimensional image and the one-dimensional time-based reflection signal.

14. The sensor according to claim 10, wherein the recognition processor stores object-specific one-dimensional time-based signal trace data or corresponding mathematical template against which the time-based reflection signature or corresponding template is compared to recognize the object.

15. The sensor according to claim 14, wherein the object-specific one-dimensional time-based signal trace data comprises respective sets of samples of respective object-specific time-based signal traces captured during a training phase, and the recognition processor interpolates between the set of samples to recreate the object-specific time-based signal traces to match against.

16. The sensor according to claim 9, wherein the object is a human subject, and the face of the object is the human subject's face.

* * * * *